Patented July 30, 1935

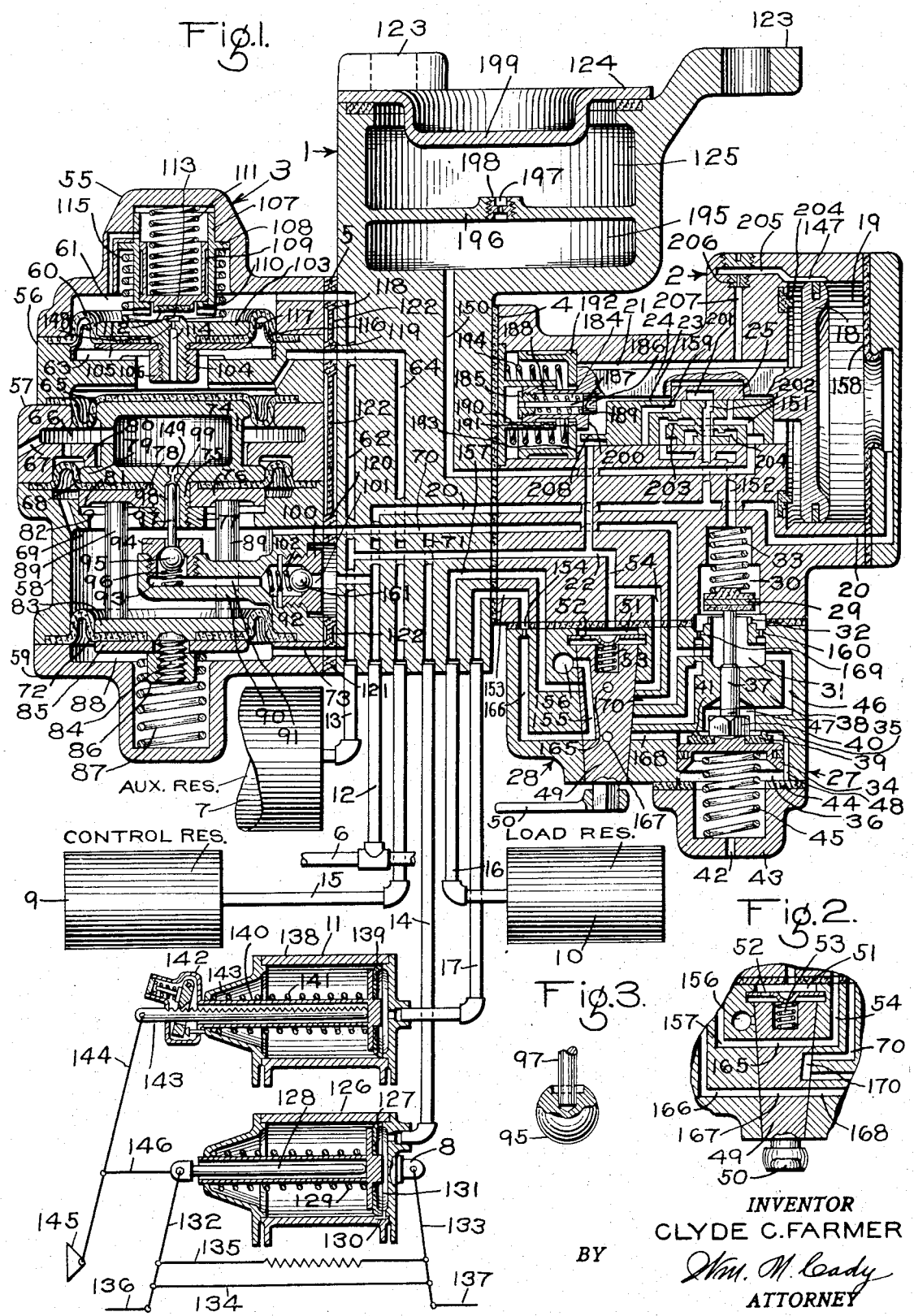

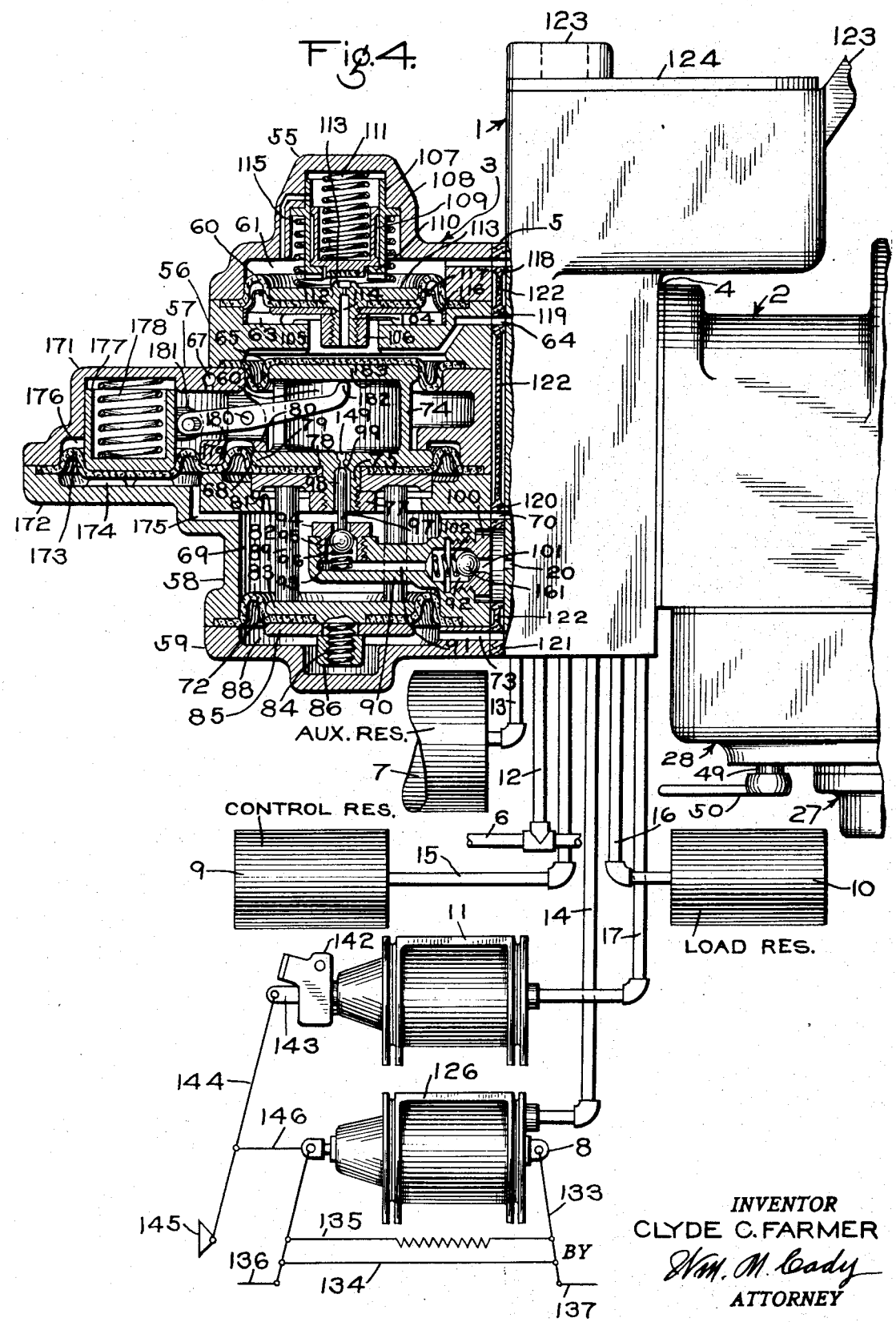

2,009,842

UNITED STATES PATENT OFFICE 2,009,842

FLUID PRESSURE BRAKE

Clyde C. Farmer, Pittsburgh, Pa., assignor to The Westinghouse Air Brake Company, Wilmerding, Pa., a corporation of Pennsylvania Application August 31, 1932, Serial No. 631,191

19 Claims. (Cl. 303—59)

This invention relates to fluid pressure brakes of the type adapted to operate upon a reduction in brake pipe pressure to effect an application of the brakes and upon an increase in brake pipe pressure to effect a release of the brakes.

It has heretofore been proposed to provide a fluid pressure brake equipment of the type having a control reservoir charged with fluid at a substantially constant pressure for controlling the operation of a control valve device to graduate the release of fluid under pressure from the brake cylinder, in effecting a release of the brakes, in accordance with the restoration of auxiliary reservoir pressure.

One object of my invention is to provide an improved fluid pressure brake equipment of the above type.

Another object of my invention is to provide a fluid pressure brake equipment of the above type, having improved means operative in effecting an application and a release of the brakes to regulate the pressure in the brake cylinder according to the pressure in the auxiliary reservoir.

In a fluid pressure brake equipment of the above type, it is customary to govern the release of fluid under pressure from the brake cylinder by a valve mechanism subject to opposing fluid pressures, which become substantially equal at the time the brakes are substantially fully released. Due to inherent resistance to operation in a device of this character, it is possible that the device may trap the final few pounds pressure in the brake cylinder, even though the controlling fluid pressures do become equal.

Another object of my invention is to provide improved means for obviating the above undesired condition.

Other objects and advantages will appear in the following, more detailed description of my invention.

In the accompanying drawings; Fig. 1 is a diagrammatic view, mainly in section, of an empty and load fluid pressure brake equipment embodying my invention and showing the load cylinder cut-out valve turned to the empty position for rendering the load brake cylinder ineffective; Fig. 2 is a diagrammatic view of the load cylinder cut-out valve turned to the load position for rendering the load brake cylinder effective; Fig. 3 is a side elevation, partly broken away, of a portion of a double beat valve employed in the improved brake equipment; and Fig. 4 is a diagrammatic view, mainly in section, of a fluid pressure brake equipment embodying a modified form of my invention.

As shown in Fig. 1 of the drawings, the fluid pressure brake equipment comprises a pipe bracket 1, having mounted on one side a brake application valve device 2 and on the opposite side a control valve device 3, gaskets 4 and 5 being interposed between said respective valve devices and the pipe bracket for effecting leakproof seals. The equipment further comprises a brake pipe 6, an auxiliary reservoir 7, an empty brake cylinder 8, a control reservoir 9, a load reservoir 10 and a load brake cylinder 11, all preferably connected to the pipe bracket 1 by pipes 12, 13, 14, 15, 16 and 17 respectively.

The brake application valve device 2 comprises a casing containing a piston 18, having a chamber 19 at one side open through passage 20 and pipe 12 to brake pipe 6 and having at the opposite side a valve chamber 21 open through passages 54, 22 and 62 and pipe 13 to the auxiliary reservoir 7. Contained in valve chamber 21 is a main slide valve 23 and a graduating valve 25 adapted to be operated by a stem 24 carried by the piston 18.

A bore 184 is provided in the end of the piston stem 24 and a plug 185 is secured in the open end of said bore. Slidably mounted in bore 184 is a plunger 186 having a stem 187 slidably extending through a suitable bore in plug 185. A spring 188 is interposed between the plug 185 and plunger 186 for urging said plunger into engagement with a shoulder 189 formed in the piston stem.

The end of the piston stem 24 is slidably mounted in a guide member or sleeve 190 provided in the casing and is provided with an annular shoulder 191 adapted to engage a plunger 192, the plunger 192 being normally pressed into engagement with a shoulder 193 formed in the casing by means of a spring 194.

Preferably carried by the casing of the brake application valve device is an inshot valve device 27 and an empty to load change over valve device 28.

The inshot valve device comprises a check valve 29 contained in a chamber 30 preferably provided in the casing of the brake application valve device. A spring 33 is provided in chamber 30 to urge said check valve into sealing engagement with a seat rib 32, provided on the casing of the inshot valve device, so as to close unrestricted communication from chamber 30 to a chamber 31.

The inshot valve device further comprises a piston 34 having at one side a chamber 35 and at the opposite side a chamber 36 and provided with a stem 37 slidably extending through a suitable wall or web 38 into chamber 31. A gasket 39 is secured to one side of said piston, preferably by means of a nut 40 having screw-threaded engagement on the stem 37, said gasket being provided with an annular seat rib or bead 41 adapted to effect sealing engagement against the casing as indicated in the drawings.

The chamber 36, at the lower side of the inshot valve piston 34, is at all times open to the atmosphere through a port 42 provided in the end wall of a cap member 43 secured to the casing of the inshot valve device, a gasket 44 being provided between said cap member and casing. A spring 45 in chamber 36 urges the piston 34 to the position shown in the drawings, in which position the piston stem 37 holds the check valve 29 away from seat rib 32. Under certain conditions to be hereinafter described, the piston 34 is moved into engagement with gasket 44, at which time the stem 37 is drawn away from the check valve 29, permitting said check valve to be pressed into engagement with seat rib 32 by means of spring 33.

A passage 46 connects chamber 31 to a chamber 47 at the opposite side of web 38, so that the pressures in said chambers will at all times be equal. A groove 48 is provided in the cylinder wall of piston 34 for connecting chambers 35 and 36 when the piston 34 is in the position shown in the drawings, for reasons which will be hereinafter described.

The empty to load change over valve device 28 comprises a plug valve 49 adapted to be turned by means of a handle 50 from the empty position shown in Fig. 1 to the load position shown in Fig. 2, or from the load position to the empty position, according to the operation desired. In the large end of the chamber 51 containing the plug valve 49, a spring seat 52 is mounted in a suitable recess in the chamber wall and a spring 53 is interposed between said spring seat and the larger end of the plug valve 49 for holding said plug valve seated, particularly when the brake system is void of fluid under pressure. The passage 54 connecting to chamber 51 leads to the valve chamber 21, so that when the brake system is charged, fluid at auxiliary reservoir pressure acts on the larger end of the plug valve 49 to maintain said plug valve properly seated.

The control valve device 3 consists of several casing sections 55, 56, 57, 58 and 59. These several casing sections are all secured together and then, as a unit, are mounted on the pipe bracket 1 against the gasket 5.

A flexible diaphragm 60 is mounted between the casing sections 55 and 56 and forms at one side a chamber 61 communicating with the auxiliary reservoir 7 through passage 62 and pipe 13 and is open at the opposite side to a chamber 63 communicating with the control reservoir 9 through passage 64 and pipe 15.

A flexible diaphragm 65 is mounted between the casing sections 56 and 57 and is open at one side to the control reservoir chamber 63 and is open at the opposite side to an atmospheric chamber 66, which is vented through an atmospheric passage 67.

A flexible diaphragm 68 is mounted between the casing sections 57 and 58 and is open at one side to the atmospheric chamber 66 and is open at the opposite side to a chamber 69 connected by passages 70 and 71 and pipe 14 to the empty brake cylinder 8.

A flexible diaphragm 72 is mounted between the casing sections 58 and 59 and is open at one side to chamber 69 and at the opposite side to a chamber 88 connected by passages 73 and 62 and pipe 13 to the auxiliary reservoir 7.

Disposed in the atmospheric chamber 66 and engaging the diaphragms 65 and 68 is a spacing member 74, said member having a stud portion 75 extending through the diaphragm 68 into chamber 69. A follower plate 76 is applied over the stud 75 to the opposite side of diaphragm 68 and is secured in position by means of a nut 77 having screw-threaded engagement on said stud.

The spacer member 74 is provided with an annular extension 79 adapted to engage an annular stop member 80 formed in the casing section 57. The follower plate 76 is provided with an annular shoulder 81 adapted to engage an annular shoulder 82 in the casing section 58. The deflection of the diaphragms 65 and 68 is, therefore, limited in one direction by the engagement of spacer member 74 with the stop member 80 and in the opposite direction by engagement of the shoulder 81 on the follower 76 with the shoulder 82 on the casing. In order that the spacer member 74 and follower plate 76 be properly spaced so as to govern the diaphragm deflection above described, the follower plate is provided, around the aperture containing stud 75, with an annular rib 78 adapted to engage the spacing member 74 and thus fix the position of the follower plate and spacing member relative to each other. The thickness of the diaphragm 68 is sufficiently greater than the depth of the rib 78, however, to ensure leak-proof compression of said diaphragm.

A follower plate 83 is disposed in chamber 69 on one side of diaphragm 72. The follower plate 83 is provided with a stud 84 extending through the diaphragm 72 and an aperture in a follower plate 85. A nut 86, having screw-threaded engagement on stud 84, clamps the diaphragm plates 83 and 85 to the diaphragm 72. A light bias spring 87 contained in chamber 88, acts on the follower plate 85. The follower plate 83 is provided with a plurality of upwardly extending struts 89, normally engaging the follower plate 76.

The casing section 58 is provided with a lug 90 extending into the chamber 69, said lug being provided with a passage 91 terminating at one end in a chamber 92 and at the opposite end in a chamber 93, the open end of chamber 93 being positioned substantially centrally below the stud portion 75 of the spacer member 74.

Screwed into the open end of chamber 93 is a valve seat plug 94 having a chamber containing a ball valve 95 adapted to seat on a tapered seat. A spring 96 is provided in chamber 93 for urging the ball valve 95 to its seat. Secured in the ball valve is a pin valve 97, which extends through a relatively large passage in the valve seat plug 94 and into a passage 98 formed in the stud 75, the passage 98 being also relatively large as compared to the diameter of the pin valve, so as to permit flow of fluid under pressure through said passages. In the passage 98 a valve seat 99 is provided and is adapted, under certain conditions, to be moved into engagement with valve 97, the area of opening through said valve seat being reduced to a predetermined size by a choke 100.

In Fig. 1 of the drawings, the pin valve 97 is shown unseated and the spacing or follower member 74 engaging the stop 80 in the casing section 57. The limited deflection of the diaphragm 68 from the position shown to that in which follower 76 engages shoulder 82 is adapted to move the seat 99 into engagement with the pin valve 97 and unseat the ball valve 95 a distance substantially the same as the pin valve 97 is unseated, as indicated in Fig. 1. In other words the deflection of diaphragm 68 may be limited to $\frac{1}{16}''$, which will provide $\frac{1}{32}''$ unseating of the pin valve 97 and $\frac{1}{32}''$ unseating of the ball valve 95, and it will be evident that when the diaphragm 68 is deflected to a mid or intermediate position, both the pin valve 97 and ball valve 95 will be seated.

I secure the pin valve 97 in the ball valve 95 in the manner shown in Fig. 3. It will be noted that the ball valve is provided with a counterbore of larger diameter than the diameter of the pin valve, the counterbore opening into a smaller bore near the center of the ball and into the smaller bore the pin valve 97 is pressed. The strains set up in the ball by the pressing in of the pin valve are thereby localized in a portion of the ball remote from the valve seat and where the cross section of the ball is greater than at the seat, thereby preventing any appreciable distortion of the ball where it seats on the plug 94.

A valve seat plug 100 is screwed into the open end of chamber 92 formed in the lug 90. Said plug is provided centrally with an opening 101 leading to a tapered valve seat. A ball valve 161 contained in chamber 92, is pressed into engagement with said seat by means of a spring 102.

A follower plate 103 is mounted on one side of diaphragm 60 and is provided with a stud portion 104 extending through said diaphragm, and a follower plate 105 is mounted over said stud portion on the opposite side of said diaphragm, a nut 106 being provided on the stud 104 for securely clamping said follower plates to said diaphragm.

Pressed into a suitable bore in the casing section 55 is a bushing 107, said bushing having a collar 108 engaging the casing, so as to position the outer end of said bushing in proper relation with follower plate 103, said bushing being adapted to limit deflection of the diaphragm 60 in one direction.

Slidably mounted in the bushing 107 is a check valve device 109. The bushing 107 is provided adjacent the open end with a stop rib 110 for limiting the outward movement of check valve device 109 by the expansive force of a spring 111. The check valve device is provided with a suitable seat 112 adapted, upon upward deflection of diaphragm 60, to engage a seat rib 113 on the follower 103, so as to close communication between chambers 61 and 63 through a passage 114 extending through the stud 104 and follower 103. A light bias spring 115 surrounds the bushing 107 and is interposed between the collar 108 on said bushing and the follower plate 103.

Under certain conditions, which will be hereinafter explained, the pressure in diaphragm chamber 61 will exceed the pressure in diaphragm chamber 63, and in order to prevent the higher pressure in chamber 61 from turning the corrugated portion of diaphragm 60 into chamber 63 and thus possibly rupturing the diaphragm, a ring 116 is provided in chamber 63 and has a portion 117 extending up into the valley of the corrugation in the diaphragm, so as to limit the movement of the corrugation into chamber 63.

It will be noted, that each of the casing sections 55, 56, 58 and 59 is provided with a passage or opening leading to the face of the gasket 8. Due to the fact that it is difficult to obtain a sufficiently good alignment of these several gasket faces to ensure a good gasket seal around the passage in each casing section with the usual type of thin gasket made of quite hard material, such as gasket 4, I provide a gasket having a ring for surrounding each passage, the several rings 118, 119, 120 and 121 being made quite thick and of a fairly soft resilient material and being secured together in their proper relative locations by means of a joining web 122 made of the same material and integral with the several rings. Due to the thickness of the several rings and their resilient character, a leak-proof seal is obtained around each passage even though the gasket faces of the several casing sections may not line up with one another.

The pipe bracket 1 is provided with suitable mounting lugs 123 and two connected quick service chambers 125 and 195 separated by a partition wall 196, communication between said chambers being provided through a restricted passage 197 provided in a plug 198 screwed into the partition wall 196. The open side of chamber 125 is closed by a removable cover plate 124 secured to the casing between the mounting lugs 123. The cover plate 124 is provided with a concave portion 199 inserted into the chamber 125, to adjust the volume of said chamber to the volume of the brake pipe on a car on which the brake equipment is installed. By providing a plurality of covers 124, each of which would have a concave portion 199 capable of effecting a different displacement in chamber 125, the volume of said chamber may be accurately adjusted to the various volumes of brake pipe found on various cars.

The empty brake cylinder 8 may be of the usual type, comprising a casing 126 containing a movable piston 127 adapted to operate a push rod 128 to apply the brakes. A spring 129, acting on the piston, is adapted to move the piston to release position in effecting a release of the brakes. In the release position of piston 127, a leakage groove 130 connects the pressure chamber 131 at one side of the piston to the non-pressure chamber at the opposite side of said piston in order to prevent possible leakage of fluid under pressure to chamber 131 from moving the piston 127 outwardly to apply the brakes.

A brake lever 133 is connected to the brake cylinder casing 126 and another brake lever 132 is connected to the push rod 128, these levers being connected together intermediate their ends by the usual tie rod 134 and release spring mechanism 135. The outer ends of levers 132 and 133 are connected to brake pull rods 136 and 137. In applying the brakes, the outward movement of piston rod 128 will rotate the lever 132, and consequently the lever 133, to exert a pulling force on the rods 136 and 137, through which rods the brakes are adapted to be applied. The inward movement of the brake cylinder piston 127 in effecting a release of the brakes, will permit the release spring mechanism 135 to return the brake levers and rods to their normal position, as will be evident.

The load brake cylinder 11 is of the usual construction, comprising a casing 138 containing a movable piston 139 for operating a hollow push rod 140, a release spring 141 being provided in said cylinder to move the piston 139 to release position in effecting a release of the brakes. Mounted on the end of the push rod 140 is a latch box mechanism 142. A notched push rod 143 is contained within the piston rod 140 and slidably extends through said latch box.

A lever 144 may have one end connected to the outer end of the push rod 143 and the other end connected to a fixed fulcrum 145, and a pull rod 146 may connect said lever to the empty brake cylinder push rod 128 in such a manner that when the load brake cylinder piston 139 operates to apply the brakes, its force will be added to the force exerted by the empty piston 127.

In applying the brakes, the empty cylinder piston 127 will be first moved past the leakage groove 130 and will then continue to move to take up the slack in the brake rigging. This movement of the empty cylinder piston will pull the load cylinder push rod 143 out of the piston rod 140, so that when the load brake cylinder operates, the latch mechanism 142 will grip the push rod 143 and immediately exert effective braking pressure with a minimum of piston travel, in the usual well known manner.

In operation, to initially charge the fluid pressure brake equipment, fluid under pressure is supplied to the brake pipe 6, in the usual well known manner, and flows from said brake pipe through branch pipe 12 and passage 20 to piston chamber 19 of the brake application valve device 2. With the piston 18 of said device in the release position, as shown in the drawings, fluid under pressure flows from chamber 19 through a feed groove 147 to valve chamber 21 and from thence through passages 54, 22 and 62 and pipe 13 to the auxiliary reservoir 7.

Fluid at the pressure supplied to the auxiliary reservoir 7 also flows from passage 62 to diaphragm chamber 61 and from said passage through passage 73 to diaphragm chamber 88, so that at all times fluid at the pressure in the auxiliary reservoir will be acting in said chambers upon the diaphragms 72 and 60.

Fluid under pressure flows from diaphragm chamber 61 through the choke 148 and the passage 144 in the diaphragm follower 103 to diaphragm chamber 63 between diaphragms 60 and 65, and from said chamber through passage 64 and pipe 15 to the control reservoir 9.

In the manner just described, the auxiliary reservoir 7 and the control reservoir 9 are charged with fluid to the pressure carried in the brake pipe, and with the pressures in said reservoirs equal and acting on the opposite sides of diaphragm 60, the light spring 115 is adapted to hold the diaphragm 60 in the position shown in the drawings, so that when the brakes are released communication is maintained open between the auxiliary reservoir and control reservoir.

Fluid at auxiliary reservoir pressure in chamber 88, acting on diaphragm 72, deflects said diaphragm upwardly until the struts 89 engage follower plate 76. The diaphragm 72 is equal in area to the diaphragm 65, and since diaphragm 65 is subject to control reservoir pressure, which normally is the same in degree as auxiliary reservoir pressure, the opposing fluid pressures on the diaphragms 65 and 72 are equal. Under this condition, the light bias spring 87 holds said diaphragms and the larger diaphragm 69 in the release position shown in the drawings. In this position, the valve seat 99 is held away from the pin valve 97, so that the brake cylinder chamber 69 and the empty brake cylinder 8, which is connected to said chamber through pipe 14 and passage 70, are open to the atmosphere through the choke 149 in the seat 99 of the pin valve, chamber 66 and atmospheric passage 67.

The empty brake cylinder passage 70 leads to chamber 31 in the inshot valve device 27, so that chamber 31 and the chamber 47 at the upper side of the inshot valve piston 34, within the seat bead 39, are also vented with the brake cylinder. Consequently, spring 45 holds the piston 34 in the position shown in the drawings, in which the inshot valve 29 is pushed away from seat rib 32. The connected quick service chambers 195 and 125 are normally vented to the atmosphere with the empty brake cylinder through passage 150, port 151 in the slide valve 23, passage 152, chamber 30 and from thence past the inshot valve 29 to chamber 31, which is open to the atmosphere with the empty brake cylinder through passage 70 as hereinbefore described.

When the empty to load change-over valve device 28 is in the empty position, as shown in Fig. 1, the load brake cylinder 11 is vented to the atmosphere through pipe 17, passage 153, choke 154, passage 166, cavity 155 in the plug valve 49, and atmospheric passage 156. The load reservoir 10 is also vented through pipe 16, passage 157, cavity 155 in the plug valve 49, and atmospheric passage 156. The load cylinder 11 and load reservoir 10 perform no function when the change-over valve device 28 is in the empty position, as shown in Fig. 1.

In order to effect an application of the brakes, fluid under pressure is vented from the brake pipe 6 in the usual manner, and as the pressure in the brake pipe reduces, fluid under pressure flows back from the piston chamber 19 of the brake application valve device 2 to the brake pipe and causes a corresponding reduction in pressure in said piston chamber.

When the pressure in piston chamber 19 is thus reduced to a degree slightly less than the auxiliary reservoir pressure acting in valve chamber 21, the piston 18 is moved outwardly to a position defined by engagement of the plunger 186 in the piston stem 24 with the outer end of the main slide valve 23. In this position, the piston 18 is moved past the feed groove 147, so as to prevent back flow of fluid under pressure from the valve chamber 21 and auxiliary reservoir to piston chamber 19 and the brake pipe. As the brake pipe pressure continues to reduce, sufficient differential of pressures is obtained on the piston 18 to cause said piston to overcome the resistance of spring 188 acting on the plunger 186 and operate to move the graduating valve 25 to a preliminary quick service position defined by engagement of shoulder 200 on the piston stem 24 with the end of the main slide valve 23.

In preliminary quick service position of the brake application valve device 2, a cavity 201 in the graduating valve 25 connects a port 202 in the main slide valve to the port 151. Port 202 registers with the brake pipe passage 20 and port 151 registers with passage 150 leading to the quick service reservoir 195, so that when said ports and passages are connected, as above described, fluid under pressure is vented from the brake pipe 6 to the quick service reservoir 195, so as to effect a local rapid, but limited, quick service reduction in brake pipe pressure in order to accelerate the operation of the brake application valve device on the next car in the train, so as to propagate serially the quick service action from car to car throughout the train, in the usual manner.

The quick service port 151 in the main slide valve 24 is also open to passage 152 leading to the inshot valve device check valve chamber 30 and from thence past the check valve 29 to chamber 31, which is in constant communication with the empty brake cylinder through passage 70 and pipe 13, so that as fluid under pressure is vented to the preliminary quick service chamber 195, it will also tend to flow to the empty brake cylinder, but such flow is so restricted by the quick service reservoir release choke 203 in port 151, as not to have any appreciable effect upon the degree of quick service reduction.

The quick service reduction in brake pipe pressure above described, is adapted to reduce the pressure in piston chamber 19 sufficiently below the pressure in valve chamber 21, that a sufficient differential of pressures is obtained on piston 18 to move said piston and the slide valves 23 and 25 to application position, in which said piston engages a gasket 158.

In application position of the main slide valve 23, a port 210 in said slide valve connects the brake pipe passage 20 to passage 150 leading to the quick service reservoir 195, so that fluid under pressure continues to flow from the brake pipe to said reservoir and from said reservoir through the restricted passage 197 to the other quick service reservoir 125. The preliminary quick service reduction in brake pipe pressure into the reservoir 195 is rapid and creates a turbulence or surges of pressure in the brake pipe which it is desirable to dispel, and in order to do so, fluid under pressure is permitted to continue to flow from the brake pipe through the charged reservoir 195 to reservoir 125, but this flow is so restricted by a choke 211 in port 210 and by the choked passage 197, as to dampen the above mentioned surges.

In the application position of the slide valves 23 and 25, an application port 159 through slide valve 23 is opened to valve chamber 21 and registers with passage 152 in the seat of the main slide valve, so that fluid under pressure from the auxiliary reservoir 7 flows through valve chamber 21 and port 159 in slide valve 23 to passage 152, thence through the inshot valve chamber 30, past the check valve 29 to chamber 31 and from thence through passage 70 to the brake cylinder chamber 69 in the control valve device 3 and also from passage 70 through passage 71 and pipe 14 to the empty brake cylinder 8.

Fluid at the pressure supplied through the inshot valve chamber 31 to the empty brake cylinder 8 also flows from said chamber through passage 46 and acts on the area of the inshot valve piston 34 within the gasket bead 41, and when a predetermined pressure is obtained in said empty brake cylinder, said pressure overcomes the opposing pressure of spring 45 on the inshot valve piston 34 and moves said piston outwardly. The initial movement of said piston breaks the seal between the gasket bead 41 and the casing, thereby exposing the full area of the inshot valve piston to brake cylinder pressure, which causes quick movement of said piston into sealing engagement with gasket 44. This movement of the inshot valve piston 34 permits spring 33 to seat the check valve 29 on the seat rib 32, after which the continued supply of fluid under pressure to the empty brake cylinder 8 occurs through a chocked passage 160, so as to provide a slow build-up of brake cylinder pressure.

It will be noted that in effecting an application of the brakes, fluid under pressure is supplied to the empty brake cylinder 8 in two stages, the initial stage being at a rapid rate and the second stage at a slow rate. The rapid supply of fluid under pressure to the empty brake cylinder is limited by the inshot valve device 27 to an amount sufficient to promptly move the brake cylinder piston 127 out past the leakage groove 130 and move the usual brake shoes (not shown) into engagement with the usual car wheels (not shown).

The inshot valve device may operate when, for instance, ten pounds pressure is obtained in the empty brake cylinder, and after the operation of the inshot valve device, the further supply of fluid to the empty brake cylinder at a slower rate is adapted to press the brake shoes (not shown) against the car wheels (not shown) and retard or stop the car.

In effecting an application of the brakes as above described, the rapid inshot of fluid under pressure to the empty brake cylinder reduces the auxiliary reservoir pressure acting in diaphragm chamber 61, at such a rate in excess of the rate at which fluid under pressure can flow back from the control reservoir to the auxiliary reservoir through the choke 148 in the diaphragm follower plate 103, that a differential of pressures is obtained on the diaphragm 60, which promptly deflects said diaphragm against the opposing pressure of spring 115 into engagement with the end of the bushing 107. This deflection of diaphragm 60 moves the seat rib 113 into sealing engagement with gasket 112 of the check valve device 109, and moves said device away from the stop 110 against the opposing pressure of spring 111. Communication is thus closed between the control reservoir and auxiliary reservoir, in effecting an application of the brakes, before any appreciable reduction in pressure in the control reservoir and diaphragm chamber 63 occurs, so that the constant pressure of the control reservoir acts on diaphragm 65 during the brake application.

When the brakes are released and the brake system charged with fluid under pressure as hereinbefore described, the control valve diaphragms 65, 68 and 72 are biased to the release position, as shown in Fig. 1, by the pressure of spring 87. In this release position, the release or pin valve 97 is unseated, so that in effecting an application of the brakes, fluid under pressure supplied by the brake application valve device to the empty brake cylinder 8 and diaphragm chamber 69 will, at the beginning of the application, vent to chamber 66 and from thence through passage 67 to the atmosphere, to a slight extent. The amount of fluid under pressure thus lost to the atmosphere is, however, not appreciable due to the fact that as soon as the auxiliary reservoir pressure acting in diaphragm chamber 88 is reduced an amount slightly exceeding the value of the light bias spring 87, the control reservoir pressure acting in chamber 63 on diaphragm 68 overcomes the opposing reduced pressure in chamber 88 acting on diaphragm 72 and promptly moves the valve seat 99 into engagement with the release valve 97, so as to close the atmospheric vent to the empty brake cylinder, after which the pressure in the empty brake cylinder and diaphragm chamber 69 increases and the brakes are applied in the manner hereinbefore described.

The volume of the auxiliary reservoir 7 is proportional to the volume created in the empty brake cylinder 8 by a predetermined standard movement of the brake cylinder piston 127, so that each pound reduction in auxiliary reservoir pressure provides a predetermined pressure in the brake cylinder. If the movement of the brake cylinder piston 127 is standard, the pressure obtained in the empty brake cylinder 8 and acting in diaphragm chamber 69 on the differential areas of diaphragms 68 and 72, compensates for the reduction in auxiliary reservoir pressure in diaphragm chamber 88 in excess of that required to offset the pressure of the bias spring 87, so that the opposing pressures acting on the diaphragms 65, 68 and 72 are the same, and consequently hold the release valve 97 seated.

If the movement of the empty brake cylinder piston 127 is less than standard, the brake cylinder volume is also less, and consequently the same amount of fluid under pressure from the auxiliary reservoir will produce a higher brake cylinder pressure than if the brake cylinder volume were standard. Under this condition, the higher brake cylinder pressure acting in chamber 69 on the differential areas of diaphragms 68 and 72 unbalances the opposing forces on diaphragms 65, 68 and 72 and deflects the diaphragms 68 and 65 upwardly. The resultant movement of the release valve seat 99 away from the release valve 97, permits fluid under pressure to be vented from the chamber 69 and the empty brake cylinder 8, until the pressure acting in said chamber and in said brake cylinder is reduced to the proper degree relative to the reduction in auxiliary reservoir pressure, at which time control reservoir pressure acting on diaphragm 65 deflects the diaphragms 65, 68 and 72 back to the lap position, in which the release valve 97 is seated.

If the movement of the empty brake cylinder piston is greater than standard, the brake cylinder volume is also greater, so that a lower than standard brake cylinder pressure is obtained by the supply of fluid under pressure from the auxiliary reservoir. Under this condition, the brake cylinder pressure obtained in diaphragm chamber 69, plus the auxiliary reservoir pressure acting in chamber 88, is inadequate to balance the opposing control reservoir pressure in diaphragm chamber 63, so that the control reservoir pressure deflects the diaphragms 65, 68 and 72 downwardly. The release valve 97 being seated, as hereinbefore described, the deflection of said diaphragms operates, through the release valve 97, to unseat the ball valve 95 against the opposing pressure of spring 96, whereupon fluid under pressure is permitted to flow from the brake pipe 6 to the empty brake cylinder by way of pipe 12, passage 20, opening 101, past the ball valve 161, through passage 91, and past the ball valve 95 to diaphragm chamber 69 and from thence through passages 70 and 71 and pipe 14 to the empty brake cylinder. Fluid under pressure is thus supplied from the brake pipe to the empty brake cylinder, until the pressure in said brake cylinder and in diaphragm chamber 69 is increased to the proper value relative to the reduction in pressure in the auxiliary reservoir and in diaphragm chamber 88. When the proper relation is obtained between brake cylinder pressure and auxiliary reservoir pressure, these pressures acting on diaphragms 68 and 72 move said diaphragms against the opposing control reservoir pressure acting on diaphragm 65 and permit the ball valve 161 to seat, so as to prevent further flow of fluid under pressure from the brake pipe to the empty brake cylinder.

If the pressure in the empty brake cylinder and diaphragm chamber 69 should reduce due to leakage, the equilibrium of forces on the diaphragms 65, 68 and 72 will be destroyed and permit control reservoir pressure in chamber 63 to deflect said diaphragm downwardly and unseat the ball valve 95 against spring 96, so as to supply fluid under pressure from the brake pipe to the brake cylinder to compensate for said leakage, in the same manner that fluid under pressure is supplied from the brake pipe to the brake cylinder in case of excess brake cylinder piston travel.

If the brake pipe pressure is reduced to below the pressure at which the auxiliary reservoir equalizes into the empty brake cylinder, it will then be evident that the pressure in the empty brake cylinder cannot be maintained from the brake pipe. Under such a condition, the maintaining valve 95 will be unseated as above described, and in order to prevent the flow of fluid at the higher pressure in the empty brake cylinder and diaphragm chamber 69 past the valve 95 to the lower pressure in the brake pipe, the ball valve 161 is provided and is pressed into engagement with its seat by means of spring 102 and brake cylinder pressure in chamber 92.

If it is desired to graduate the application of brakes, the brake pipe pressure is reduced in steps. The application valve device 2 responds to the steps of reduction in brake pipe pressure and effects corresponding steps of reduction in auxiliary reservoir pressure in the usual manner, and the control valve device 3 operates in the manner hereinbefore described to govern the pressure obtained in the empty brake cylinder, so that it will increase in the proper relation to the reduction in auxiliary reservoir pressure.

Since the bias spring 87, acting on the diaphragm 72, is added to the auxiliary reservoir pressure acting on said diaphragm and causes a slight initial venting of fluid under pressure from the brake cylinder until the auxiliary reservoir pressure is reduced a degree slightly exceeding the value of said spring, the ultimate brake cylinder pressure obtained is less than would be obtained if the bias spring 87 were not employed, by an amount equal to the value of said spring. In other words, if the value of spring 87 is equal to two pounds of auxiliary reservoir pressure and the ratio between the pressure obtained in the brake cylinder per pound reduction in auxiliary reservoir pressure is 2½:1, then the pressure obtained in the empty brake cylinder for any reduction in brake pipe and auxiliary reservoir pressures will be about 2×2½ or five pounds less than the proportionate value.

In order to release the brakes after an application, fluid under pressure is supplied to the brake pipe 6 and piston chamber 19 of the brake application valve device 2. When the pressure in piston chamber 19 is thus increased a predetermined degree over the auxiliary reservoir pressure acting in valve chamber 21, the piston 18 is operated and moves the slide valves 23 and 25 to the release or charging position, as shown in the drawings.

When the slide valve 23 moves to release position, the application port 159 is moved out of registry with the brake cylinder passage 152 and the quick service reservoirs 195 and 125 are placed in communication with said passage through passage 150 and port 151 in slide valve 23, so that fluid under pressure is vented from the quick service reservoirs with the venting of fluid under pressure from the empty brake cylinder, as will be hereinafter described.

In the release position of the piston 18 fluid under pressure is supplied from the brake pipe through piston chamber 19 and feed groove 147 to valve chamber 21 and from thence through passages 22 and 62 and pipe 13 to the auxiliary reservoir 7 and also from passage 62 through passage 13 to the diaphragm chamber 88 in the control valve device.

The increase in auxiliary reservoir pressure in chamber 88 acting on diaphragm 72, plus brake cylinder pressure in diaphragm chamber 69 acting on the differential areas of diaphragms 68 and 72, overcomes the opposing control reservoir pressure acting on diaphragm 65 and deflects the diaphragm 72, 68 and 65 upwardly, thereby moving the release valve seat 99 away from the release or pin valve 97, which permits fluid under pressure to be released from the empty brake cylinder 8 through pipe 14, passage 70, diaphragm chamber 69, past the release valve 99 to chamber 66, and from thence to the atmosphere through passage 67. The rate at which fluid under pressure can be thus released from the empty brake cylinder is controlled by the flow area of choke 149, said choke being of smaller area than the area of the atmospheric passage 67, so that fluid under pressure vented to chamber 66 will be quickly dissipated to the atmosphere.

If it is desired to graduate the release of fluid under pressure from the empty brake cylinder 8, the increase in brake pipe pressure and, consequently the increase in pressure in the auxiliary reservoir and diaphragm chamber 88, is limited to a predetermined amount governed by the degree of release desired.

The control valve device 3 is operated by the predetermined increase in auxiliary reservoir pressure in diaphragm chamber 88 to vent fluid under pressure from the empty brake cylinder, as above described. When the pressure in the empty brake cylinder is thus reduced a degree slightly exceeding the proportionate degree of increase in auxiliary reservoir pressure acting in diaphragm chamber 88, the control reservoir pressure in chamber 63 acting on diaphragm 65, overcomes the opposing pressures of the empty brake cylinder in chamber 69 acting on the differential areas of diaphragms 68 and 72, and aided by auxiliary reservoir pressure and the pressure of spring 87 in chamber 88 acting on diaphragm 72, and deflects said diaphragms so as to move the release valve seat 99 into engagement with the release valve 97. With the release valve 97 thus seated, further venting of fluid under pressure from the empty brake cylinder is prevented.

When it is desired to effect a further or another step of reduction in brake cylinder pressure, the brake pipe pressure is again increased an amount according to the degree of release desired. The consequent increase in auxiliary reservoir pressure acting in diaphragm chamber 88, again operates the control valve device 3 to effect a further and proportionate reduction in pressure in the empty brake cylinder 8. In this manner the pressure in the empty brake cylinder may be graduated off or reduced in steps as desired.

In effecting a release of the brakes as above described, it will be evident that the bias spring 87 at all times acts to aid auxiliary reservoir pressure to move the diaphragms 72, 68 and 65 to the release position, in which the release valve seat 99 is moved away from the release valve 97. As hereinbefore described, the bias spring 87 may exert a pressure on the diaphragm 72 equal to two pounds of auxiliary reservoir pressure. It will, therefore, be evident that if the standard brake pipe pressure carried is seventy pounds, then when about sixty-eight pounds brake pipe pressure is obtained, the same pressure acting in the auxiliary reservoir and on diaphragm 72 and aided by the pressure of spring 87, exerts on said diaphragm a pressure equal to the standard brake pipe pressure. When this approximate sixty-eight pounds pressure is, therefore, obtained in the auxiliary reservoir, it is intended that this pressure and the pressure of spring 87 on the diaphragm 72 deflect said diaphragm and the diaphragms 68 and 65 to release position and to maintain them in release position, so that the empty brake cylinder will be open to the atmosphere upon completing the release of the brakes. The brake pipe and auxiliary reservoir will, however, continue to be charged up to the standard pressure, and the consequent further two pound increase in auxiliary reservoir pressure will permit the spring 87 to bias the control valve device to release position, so as to ensure that the brake cylinder will be maintained open to the atmosphere when the brakes are intended to be released.

It is well known, that in any device of the character of the control valve device 3, there is certain inherent resistance to operation which is very difficult to control. If the bias spring 87 were not employed, this uncontrolled resistance to operation might be such as to prevent the final movement of the control valve device 3 to the release position, even though the auxiliary reservoir pressure acting in chamber 88 should be increased to the full degree. As a consequence, the final four or five pounds fluid pressure in the brake cylinder might remain bottled in the brake cylinder and cause the usual car brake shoes (not shown) to exert a light braking force against the car wheels (not shown) when it is intended that the brakes be completely released. By the use of bias spring 87, this difficulty is overcome, however, since said spring exerts a pressure on diaphragm 72 which will exceed the worst condition of uncontrolled resistance which might be obtained in the control valve device, so that in effecting a release of the brakes, the final movement of the control valve device to the release position is ensured.

In effecting a release of fluid under pressure from the empty brake cylinder 8, fluid under pressure is vented from the connected chambers 31 and 35 in the inshot valve device through passage 70, through which passage fluid under pressure is released from the empty brake cylinder, so that the pressure in said chambers is reduced as the pressure in the empty brake cylinder is reduced. When the pressure in chamber 35 at the inner side of the inshot valve piston 34 is thus reduced to a predetermined low degree, spring 45 urges the inshot valve piston 34 away from the gasket 44. As the piston 34 moves away from the gasket 44, the groove 48 is opened to chamber 36, which permits fluid under pressure to flow from chamber 35 to chamber 36. This flow of fluid under pressure to chamber 36 reduces the pressure acting in chamber 35 at the inner side of the piston 34 and tends to increase the pressure in chamber 36 at the opposite side of said piston, so as to aid the spring 45 to promptly move the piston 34 to its normal position, as shown in the drawings.

In the normal position of the inshot valve piston 34, the gasket bead 41 seals against the casing and the stem 37 unseats the check valve 29 preparatory to a succeeding application of the brakes.

The quick service reservoirs 195 and 125 being connected through the application valve device 2 to chamber 30 in the inshot valve device 27 and from chamber 30 through choke 160 and past the check valve 29, upon the unseating thereof, to the chamber 31, fluid under pressure is released from said quick service reservoirs as fluid under pressure is released from the empty brake cylinder 8, as will be evident.

As hereinbefore described, the release of fluid under pressure from the empty brake cylinder 8 is controlled by the flow area of choke 149 in the control valve device, and the flow area of passage 67, through which chamber 66 is vented, is so much greater than that of choke 149, as to prevent any appreciable increase in pressure in chamber 66 during the releasing operation. According to this construction, the pressure in chamber 66, acting on diaphragms 65 and 68, is at all times substantially atmospheric pressure, so that the operation of the control valve device in effecting a release of the brakes will not be influenced by the venting of fluid under pressure from the brake cylinder through chamber 66.

In effecting a release of the brakes, when the auxiliary reservoir 7 becomes charged to substantially the pressure carried and acting in the control reservoir, the auxiliary reservoir pressure acting in chamber 61 upon the diaphragm 60 and aided by the pressure of springs 115 and 111 deflects said diaphragm toward the control reservoir pressure acting in chamber 63 on the opposite side of said diaphragm. The deflection of diaphragm 60 moves the seat rib 113 out of engagement with gasket 112, so as to permit equalization of pressures in the auxiliary reservoir and control reservoir, as would be required in case the control reservoir pressure had become slightly reduced, due to leakage, while the brakes were applied and said reservoir was isolated from the auxiliary reservoir.

When an application of the brakes is effected, back flow of fluid under pressure from the control reservoir to the auxiliary reservoir through passage 114 in the diaphragm follower plate stud 104, is prevented by the seating of the check valve gasket 112 against the seat rib 113 on the follower plate. The check valve gasket is resiliently pressed against seat rib 113 by the spring 111 and said spring is sufficiently strong to prevent the unseating of said check valve upon a full application of the brakes, in which case, the auxiliary reservoir pressure is reduced to the maximum extent and the differential of pressures in the auxiliary reservoir and control reservoir acts on the small seated area of said valve gasket within the seat rib. According to this construction, the seat gasket 112 is at no time subject to the force developed by the above described differential of pressures acting upon the full area of the diaphragm 60, which force would tend to disrupt said seat gasket.

In effecting a release of the brakes, it is customary for the engineer to initially move the usual brake valve device (not shown) to full release position, in which position fluid at the high pressure carried in the usual main reservoir (not shown) is supplied directly to the brake pipe. Then after a certain lapse of time, the engineer moves the brake valve device to running position, in which the pressure supplied to the brake pipe is reduced to that normally carried in the brake pipe by the usual feed valve device (not shown).

In manipulating the brake valve device as above described, high brake pipe pressure is obtained particularly on the front portion of the train, and in order to prevent the auxiliary reservoir 7 and control reservoir 9 on cars in the front portion of the train from becoming charged to a pressure higher than normal, the high brake pipe pressure is adapted to move the brake application valve piston 19 and slide valves 23 and 25 to an inner position. This movement is opposed by the pressure of spring 194 on plunger 192 which engages the shoulder 191 on the piston stem 24, said movement being limited by engagement of piston 18 against a gasket 204.

When piston 18 engages the gasket 204, the flow of fluid under pressure from the brake pipe to the valve chamber 21 and from thence to the auxiliary reservoir 7 and control reservoir 9 occurs through the feed groove 147, a passage 205, a choke plug 206, and a passage 207 opening into the valve chamber 21. The flow capacity of choke plug 206 is less than that of feed groove 147, so that in the inner position of the brake application valve parts, the charging of the auxiliary and control reservoirs is restricted to a degree where said reservoirs will not become charged to a pressure higher than normally carried, while the brake valve device is in the full release position.

When the brake valve device is moved from full release position to running position and the brake pipe pressure in the front portion of the train reduces to or below the pressure supplied by the usual feed valve device (not shown), the pressure of spring 194 is adapted to move the piston 18 and slide valves 23 and 25 back to the normal release position, as shown in Fig. 1 of the drawings, such movement of the main slide valve 23 to the normal position being accomplished through direct engagement of the plunger 192 with a finger 208 projecting from said slide valve.

When the brake application valve parts are in the inner position, the control valve device operates to release fluid under pressure from the brake cylinder in accordance with the increase in auxiliary reservoir pressure, in the same manner as hereinbefore described. Communication is maintained from the quick service reservoir passage 150 through port 151 in the main slide valve 23 to passage 152, in the inner position of said slide valve, so that fluid under pressure is released from the quick service reservoirs 195 and 125 the same as when said slide valve is in the normal release position. The brake pipe passage 20 leading to the seat of the main slide valve 23 is lapped, however, when said slide valve is in the inner position, the purpose being to prevent the high brake pipe pressure supplied to passage 20 from acting on the seat of the graduating valve 25 and blowing said slide valve off its seat. However, the movement of the main slide valve from the inner to the normal release position reestablishes communication from the brake pipe passage 20 to the seat of the graduating valve 25 through port 202, so that quick service operation will be effective upon a subsequent application of the brakes.

If the engineer should permit the brake valve device (not shown) to remain in the full release position for a period of time sufficient for the auxiliary reservoir and control reservoir to become charged, through the choke plug 206, to a pressure higher than normally carried and he desires to reduce the pressure in said reservoirs to normal, he merely places the brake valve device in running position, in which position the feed valve device is adapted to function to supply fluid under pressure to the brake pipe after the brake pipe pressure has become reduced by leakage, to the pressure supplied by the feed valve device.

The maximum permissible rate of leakage of fluid under pressure from the brake pipe is such that, as the brake pipe pressure reduces, fluid under pressure will flow back from the auxiliary reservoir 7 and valve chamber 21 through feed groove 147 to chamber 19 and from thence to the brake pipe without creating sufficient differential of pressures on piston 18 to move said piston out of full release position. In other words, the rate of permissible brake pipe leakage is less than the rate at which the brake pipe pressure is reduced to effect an application of the brakes, so that the application valve device 2 will not respond to a reduction in brake pipe pressure caused by leakage and move to application position. As the auxiliary reservoir pressure is thus reduced, fluid under pressure flows back from the control reservoir 9 and diaphragm chamber 63 through passage 114 in the diaphragm follower stud 104, and through choke 148 to diaphragm chamber 61 communicating with the auxiliary reservoir. Thus, fluid under pressure flows from the control reservoir to the auxiliary reservoir and from thence to the brake pipe as the brake pipe pressure is reduced by leakage, thus reducing the pressure in both of said reservoirs. With the brake valve device (not shown) in the running position, the brake pipe pressure will be reduced by leakage only to the setting of the usual feed valve device, at which time the feed valve device will operate to maintain the brake pipe pressure, so that the pressures in the control reservoir and auxiliary reservoir can continue to flow to the brake pipe only until the standard pressure carried in the brake pipe and governed by the feed valve device is obtained.

The rate at which auxiliary reservoir pressure reduces through the feed groove 147 is governed by the rate of brake pipe leakage, as hereinbefore described, and is such that control reservoir pressure can reduce through choke 148 sufficiently fast that spring 115 can maintain diaphragm 60 in the position in which communication through choke 118 is open. If the rate of reduction in brake pipe and auxiliary reservoir pressures is the rate employed in effecting an application of the brakes however, control reservoir pressure cannot flow through choke 148 fast enough to prevent obtaining sufficient differential of pressures on diaphragm 60 to deflect said diaphragm against spring 115 and bottle up the control reservoir, as hereinbefore described.

In the above description of operation, the change-over valve device 28 was assumed to be in the empty car position, in which the load reservoir 10 and load brake cylinder 11 were ineffective in applying the brakes. However, for controlling the brakes on a loaded car, the change-over valve device 28 is turned from the cut-out position, indicated in Fig. 1, to the cut-in position, indicated in Fig. 2.

In cut-in position of the change-over valve 28, the load reservoir 10 is connected through pipe 16, passage 157, port 165 in the change-over valve plug valve 49, and passage 54 to valve chamber 21 of the application valve device 2, so that when the brake equipment is charged with fluid under pressure as hereinbefore described, fluid under pressure will also be supplied to and charge the load reservoir. The load brake cylinder 11 is vented to the atmosphere when the inshot valve device 27 is in its normal or release position, by way of pipe 17, passage 153, choke 154, passage 166, port 167 in plug valve 49, passage 168, chamber 35 at the inner side of the inshot valve piston 34, groove 48 around said piston, chamber 36 and through the atmospheric passage 42.

With the load reservoir 10 and load brake cylinder 11 cut into operation, the application valve device 2 operates upon a reduction in brake pipe pressure in the same manner as hereinbefore described, to supply fluid under pressure for applying the brakes, but in this case, since the load reservoir 10 is in communication with the application valve slide valve chamber 21 as well as the auxiliary reservoir 7, fluid under pressure is supplied from both of said reservoirs to the inshot valve device 27.

The inshot valve device 27 operates, as hereinbefore described, to permit an initial rapid flow of fluid under pressure to the empty brake cylinder 8 for moving the empty brake cylinder piston 127 to application position, and then when a predetermined pressure, such as ten pounds, is obtained in the empty brake cylinder, the inshot valve device 27 operates to permit the check valve 29 to seat.

The load brake cylinder 11 is maintained vented to the atmosphere through port 167 in the change-over plug valve 49 and from thence through passage 168, inshot valve piston chamber 35, groove 48 and vented chamber 36, until the inshot valve piston 34 is moved to its lower position into engagement with gasket 44 and closes communication from the groove 48 to the vented chamber 36.

In the lower position of the inshot valve piston 34, the load cylinder 11 is connected through port 167 in the change-over valve plug valve 49, passage 168, chamber 35 at one side of the inshot valve piston 34, and passage 46 to chamber 31, which communicates through passages 70 and 71 and pipe 14 with the empty brake cylinder 8, so that the pressures in the empty and load brake cylinders equalize and increase together.

After the seating of the check valve 29, fluid under pressure continues to be supplied from the auxiliary reservoir 7 and load reservoir 10 through choked passage 160 to chamber 31 and also through another choked passage 169, a cavity 170 in the plug valve 49 and passage 70 opening into chamber 31. It will be evident that the two choked passages 160 and 169 are arranged in parallel and since chamber 31 is in communication with both the empty brake cylinder and the load brake cylinder, the pressures in both of said brake cylinders increase at a rate governed by the combined flow capacities of both of said choked passages. The choked passage 169 is operative only when the load cylinder 11 is cut into operation to provide the same rate of increase in pressure in the two brake cylinders as is obtained by the use of the choked passage 160 when only the empty cylinder 8 is operative.

The initial rapid supply of fluid under pressure to the empty brake cylinder moves the empty brake cylinder piston 127 outwardly to the brake applying position, and this movement of said piston pulls the push rod 143 outwardly of the load cylinder piston rod 140. The initial movement of the load piston 139 then permits the latch box mechanism 142 to operate to grip the push rod 143 in the usual manner, so as to limit the movement of the load piston 139 to a predetermined small amount before applying effective braking force.

By thus limiting the movement of the load brake cylinder piston 139, the volume of the load reservoir 10 is proportionally small as compared to the volume of the auxiliary reservoir 7, which bears the same relation to the displacement of the empty cylinder piston 127, which operates to take up the slack in the brake rigging before applying effective braking force.

The choke 154 is interposed between the inshot valve device 27 and load brake cylinder 11, so as to prevent a too rapid flow of fluid under pressure from chambers 35 and 31 in the inshot valve device and from the connected empty brake cylinder 8 to the load brake cylinder 11 upon operation of the inshot valve device to connect both of said cylinders. By thus holding back the supply of fluid under pressure to the load brake cylinder, a sufficient pressure is retained in chamber 35 acting upon the inshot valve piston 34, to ensure said piston remaining in engagement with the gasket 44 against the opposing pressure of spring 45. As soon as the load cylinder pressure is increased to a degree where the flow from the inshot valve piston chamber 35 to the load cylinder cannot reduce the pressure in said chamber to a degree low enough to permit spring 45 to move the piston 34 to its normal position, the purpose of choke 154 is accomplished and then at about the time equalization of the pressures in the empty and load cylinders is obtained, the continued increase of pressure in said cylinders is governed by the combined flow capacities of choked passages 160 and 169, the size of choke 154 being such as not to govern this continued increase. The choke 154 performs no function in effecting a release of the brakes, as will be hereinafter described.

In effecting an application of the brakes with the load reservoir 10 and load cylinder 11 cut into operation, the control valve device 3 operates in the same manner as when only the empty brake cylinder 8 is operative, said control valve device operating to bottle up the control reservoir, to close the brake cylinder exhaust past the release valve 91, to supply fluid under pressure from the brake pipe to the brake cylinder to compensate for excess piston travel and to maintain the brake cylinder pressure against leakage, if necessary, and to vent fluid under pressure from the brake cylinder in case the piston travel is too short, in other words, the control valve device operates automatically to provide and maintain the proper pressure in the empty and load brake cylinders.

With the load reservoir 10 and load cylinder 11 cut into operation, if it is desired to effect a release of the brakes after an application, the brake pipe pressure is increased and moves the application valve device to release position, in which the auxiliary reservoir 7 and load reservoir 10 are recharged with fluid under pressure from the brake pipe, and the control valve device 3 operates in the same manner as hereinbefore described, to vent fluid under pressure from the empty brake cylinder 8 and the connected load brake cylinder 11 in accordance with the increase in pressure in said reservoirs. When the brake cylinder pressure acting in chamber 35 upon the inner side of the inshot valve piston 34, is reduced to a predetermined low degree, spring 45 moves said piston away from the gasket 44 and to its normal position, in which position the load brake cylinder 11 is disconnected from the empty brake cylinder 8 and vented directly to the atmosphere through port 167 in the change-over valve plug valve 49, passage 168, chamber 35, groove 48 around the inshot valve piston 34, chamber 36 and through the atmospheric passage 42, thereby ensuring a complete release of fluid under pressure from the load brake cylinder 11. A complete release of fluid under pressure from the empty brake cylinder 8 is assured by the pressure of bias spring 87 upon the control valve diaphragm 72, as hereinbefore described.

In order to cut the load reservoir 10 and load brake cylinder 11 out of operation, when desired, the change-over plug valve 49 is turned from the load position, indicated in Fig. 2, to the empty position, indicated in Fig. 1. In the empty position, the load reservoir 10 is vented through pipe 16, passage 157, cavity 155 in the plug valve 49 and atmospheric passage 156 and the load cylinder 11 is vented through pipe 17, passages 153 and 156, cavity 155 and atmospheric passage 156, so that neither the load reservoir nor the load cylinder is operative when the equipment is operated on an empty car.

From the foregoing description of operation, it will be noted that in effecting an application of the brakes, a sudden inshot of fluid under pressure is provided to the empty brake cylinder for moving the empty brake cylinder piston to take up the slack in the brake rigging and for moving the usual car brake shoes (not shown) into engagement with the car wheels. This inshot is limited to a pressure of for instance ten pounds, and is followed by a slower supply of fluid under pressure to the empty brake cylinder or to the empty and load brake cylinders in case the apparatus is adjusted for loaded car operation, the slower rate of supply of fluid under pressure providing the same rate of increase in the empty cylinder by itself as obtained when the load cylinder is cut into operation. In other words, the brake equipment operates to provide a two stage application of the brakes, the first stage in both empty and loaded car operation consisting of the inshot of fluid under pressure to the empty brake cylinder, while the second stage consists of the slower build-up of pressure in either the empty brake cylinder or the empty and load brake cylinders, in case the load cylinder is cut into operation.

When an application of the brakes is effected with the brake apparatus illustrated in Fig. 1, the pressure obtained in the one or both brake cylinders for any degree of reduction in brake pipe pressure, is limited by the pressure of the bias spring 87 on the diaphragm 72. If, for instance, the apparatus is proportioned to produce 2½ pounds pressure in the brake cylinder for each pound reduction in auxiliary reservoir pressure, and the pressure of spring 87 is equivalent to two pounds auxiliary reservoir pressure, then the brake cylinder pressure obtained upon a reduction in brake pipe pressure is 2½×2 or five pounds less than the 2½:1 ratio, as hereinbefore described. In order to obtain a pressure in the brake cylinder having the 2½:1 relation to the reduction in auxiliary reservoir pressure and at the same time retaining the final release function of the bias spring 87, the modified construction illustrated in Fig. 4 is provided.

According to the modified construction illustrated in Fig. 4, the bias spring 87 is dispensed with and mechanism having the function of said spring to ensure the final release of fluid under pressure from the brake cylinder is provided, said mechanism being operative to exert a bias pressure on the control valve device 3 only when the brake cylinder pressure is less than a predetermined degree, such for example as five pounds. When the brake cylinder pressure exceeds the five pounds, the biasing pressure of the mechanism upon the control valve device is completely removed, so that the control valve device will operate to provide a pressure in the brake cylinder or cylinders bearing the proper relation to the reduction in auxiliary reservoir pressure.

The brake equipment shown in Fig. 4 is substantially the same as shown in Fig. 1. According to the invention, the diaphragm 72 is not subject to the pressure of a bias spring such as the bias spring 87 employed in Fig. 1. The control valve casing section 57 is provided with a lug 171 projecting therefrom, while the casing section 58 is provided with a similar lug 172, and a flexible diaphragm 173 is clamped between said lugs.

The flexible diaphragm 173 is open at one side to a chamber 174, which is connected by a passage 175 to the brake cylinder chamber 69 in the control valve device, while said diaphragm is open at the opposite side to a chamber 176 opening into chamber 66 of the control valve device, the chambers 176 and 66 being at all times open to the atmosphere through the atmospheric passage 67.

A sleeve-like member 177 is slidably mounted in a suitable bore in the casing, said bore opening into chamber 176. One end of said sleeve is closed to form a diaphragm follower plate which is pressed into engagement with the diaphragm 173 by means of a spring 178 contained in said sleeve and interposed between the closed end thereof and the casing wall.

A lever 179 is pivotally mounted intermediate its ends on a suitable pin 180 carried by the casing section 56. One end of said lever is pivotally connected to a lug 181 projecting from the side of the sleeve-like member 177, while the other end of said lever is preferably bent to form a finger 182 adapted at certain times to engage the inner wall 183 of the spacing member 74.

Since the chamber 176 at one side of the diaphragm 173 is at all times vented through the atmospheric passage 67 and the chamber 174 at the opposite side of said diaphragm is normally vented through passage 175 and chamber 69 with the brake cylinder, the diaphragm 173 is normally subject on its opposite sides to atmospheric pressure, which permits spring 178 to urge the sleeve 177 and turn lever 179 to the positions shown in Fig. 4 of the drawings. With the lever 179 in this position, it holds the diaphragm spacer member 74 in the brake release position, in which the extension 79 on said member engages the stop member 80 in the casing and the release valve seat 99 is held away from the release valve 97, so that diaphragm chamber 69 and the empty brake cylinder 8, which is at all times open to said chamber, are vented past the release valve to chamber 69 and from thence to the atmosphere through passage 67.

In effecting an application of the brakes, the control reservoir pressure in chamber 63 acting on diaphragm 65, deflects said diaphragm and diaphragms 68 and 72 downwardly, so as to seat the release valve 97 against the seat 99 upon a reduction in the opposing auxiliary reservoir pressure acting in chamber 88 on diaphragm 72, in the same manner as in the construction illustrated in Fig. 1. Fluid under pressure supplied from the auxiliary reservoir 7 to the empty brake cylinder 8 and diaphragm chamber 69 in the control valve device 3, flows from said chamber through passage 175 to chamber 174 below the bias spring diaphragm 173. When a predetermined low pressure, such for instance as five pounds, is obtained in the empty brake cylinder and diaphragm chamber 174, said pressure is adapted to deflect the diaphragm 173 and move the sleeve 177 against the pressure of spring 178. This movement of sleeve 177 turns the lever 179 on the pin 180 in a clockwise direction, so as to move the finger 182 out of engagement with the spacer member 74. The pressure of bias spring 178 is thus removed from the spacer member 74, so as not to aid auxiliary reservoir pressure in chamber 88 in governing the pressure obtained in the brake cylinder, as occurs in the construction disclosed in Fig. 1.

As in the construction shown in Fig. 1, there may be a slight venting of fluid under pressure supplied from the auxiliary reservoir to the brake cylinder, until the action of the bias spring 178 is annulled, but upon removing the effort of said spring from the spacer member 74, if the brake cylinder pressure in chamber 69 does not bear the proper relation to the reduction effected in auxiliary reservoir pressure, then the control reservoir pressure continues the deflection of diaphagm 65 against the opposing pressures of the auxiliary reservoir in chamber 88 acting on diaphragm 72 and of the brake cylinder in chamber 69 acting on the differential areas of diaphragms 68 and 72, and unseats the ball valve 95 so as to permit fluid under pressure to flow from the brake pipe to the empty brake cylinder. When the empty brake cylinder pressure is thus increased to the proper degree relative to the reduction in auxiliary reservoir pressure, the control valve device returns to its intermediate or lap position in which the ball valve 95 seats and the release valve 97 is also seated. Further reductions in auxiliary reservoir pressure then effect the required proportional increase in pressue in the empty brake cylinder and the maximum pressure obtainable in said brake cylinder is equal to the equalization of the pressures in the auxiliary reservoir and said brake cylinder.

The proper relation between brake cylinder pressure and auxiliary reservoir pressure will be automatically maintained with this brake equipment in case of variations in brake cylinder piston travel or leakage from the brake cylinder in the same manner as occurs in the equipment illustrated in Fig. 1.

When it is desired to effect a release of the brakes, the brake pipe pressure is increased and the brake equipment responds in the same manner as hereinbefore described, to vent fluid under pressure from the empty brake cylinder. The bias spring 178 remains ineffective, however, until the brake cylinder pressure acting in chamber 174 is reduced to such an extent that said spring is permitted to expand and exert its force, through the lever 179, upon the diaphragm spacer member 74, at which time the pressure of said spring aids the auxiliary reservoir pressure acting in chamber 88 on the diaphragm 72 and moves the control valve device to the release position indicated in the drawings, in which position, a complete release of fluid under pressure from the empty brake cylinder is obtained. In case the load brake cylinder 11 is cut into operation, the brake equipment operates in the same manner as hereinbefore described.

It will now be noted, that when, with the equipment illustrated in Fig. 1, the bias spring 87 is at all times effective to limit the pressure obtained in the brake cylinder, or brake cylinders, according to its effort, the bias spring 178 in the modified construction has no control over the brake cylinder pressure after being rendered ineffective and therefore does not limit the brake cylinder pressure, but in both constuctions the respective bias spring acts to ensure that the empty brake cylinder will be open to the atmosphere upon a full release of the brakes after an application.

From the foregoing description of operation, it will be noted that I have provided an improved fluid pressure brake equipment of the type having a control reservoir and a control valve device governed by the constant pressure obtained in said reservoir and operative in effecting both an application and a release of the brakes to regulate the pressure acting in the brake cylinder, so that said pressure will have a predetermined relation to the pressure in the auxiliary reservoir, regardless of leakage of fluid under pressure from the brake cylinder, or variations in the travel of the brake cylinder piston. In order to ensure a complete release of fluid under pressure from the brake cylinder, improved means are provided to ensure that the control valve device will be in release position, and the brake cylinder, therefore, vented to the atmosphere, when the brake equipment is fully charged in effecting a release of the brakes.

The valve mechanism for controlling the build-up of brake cylinder pressure in effecting an application of the brakes is claimed in my pending application Serial No. 612,465, filed May 20, 1932, and the subject matter relating to the quick service venting of fluid from the brake pipe and the stabilizing of the action of the triple valve mechanism is broadly claimed in my above mentioned pending application and application Serial No. 473,323, filed August 6, 1930.

While one illustrative embodiment of the invention has been described in detail, it is not my intention to limit its scope to that embodiment or otherwise than by the terms of the appended claims.

Having now described my invention, what I claim as new and desire to secure by Letters Patent is:

1. In a fluid pressure brake, the combination with a brake pipe, an empty brake cylinder, an auxiliary reservoir, a load brake cylinder and a load reservoir, of a valve device operated upon a reduction in brake pipe pressure to supply fluid under pressure from said reservoirs to a chamber normally communicating with said empty brake cylinder through two restricted passages and an unrestricted passage, all of said passages being arranged so that the flow of fluid under pressure through each is independent of the flow of fluid under pressure through the others, valve means operated upon a predetermined increase in pressure in said empty brake cylinder to close communication through said unrestricted passage and connect said load brake cylinder to said empty brake cylinder, and a change-over valve device having one position for connecting said load reservoir to said auxiliary reservoir, said load brake cylinder to said valve means, and for opening one of said restricted passages, said change-over valve device being movable to another position for disconnecting the load reservoir from said auxiliary reservoir, the load brake cylinder from said valve means and for closing the last mentioned restricted passage.

2. In a fluid pressure brake, the combination with a brake pipe, an empty brake cylinder, an auxiliary reservoir, a load brake cylinder and a load reservoir, of a valve device operated upon a reduction in brake pipe pressure to supply fluid under pressure from said reservoirs to a chamber normally communicating with said empty brake cylinder through two restricted passages and an unrestricted passage, all of said passages being arranged so that the flow of fluid under pressure through each is independent of the flow of fluid under pressure through the others, valve means operated upon a predetermined increase in pressure in said empty brake cylinder to close communication through said unrestricted passage and connect said load brake cylinder to said empty brake cylinder, and a change-over valve device having one position for establishing communication from said load reservoir to said auxiliary reservoir, from said load brake cylinder to said valve means and for controlling communication through one of said restricted passages, said change-over valve device being movable to another position for closing the three last mentioned communications and for venting the load reservoir and load brake cylinder to the atmosphere.

3. In a fluid pressure brake, the combination with a brake pipe, an empty brake cylinder and a load brake cylinder, of a valve device operated upon a reduction in brake pipes pressure to supply fluid under pressure to said empty brake cylinder, valve means normally venting said load brake cylinder, said valve means being subject to the pressure of fluid acting in said empty brake cylinder and operated upon a predetermined increase in pressure in said empty brake cylinder to establish a communication between said empty and load brake cylinders through which fluid under pressure is supplied to said load brake cylinder and to restrict the supply of fluid under pressure from said valve device to said empty brake cylinder, and a choke interposed in said communication between said valve means and said load brake cylinder for limiting the reduction in pressure on said valve means upon flow to said load brake cylinder and thereby prevent operation of said valve means to close said communication and vent said load brake cylinder.

4. In a fluid pressure brake, the combination with a brake pipe, an empty brake cylinder and a load brake cylinder, of a valve device operated upon a reduction in brake pipe pressure to supply fluid under pressure to said empty brake cylinder through a restricted passage and an unrestricted passage, valve means normally venting said load brake cylinder and subject to the pressure of fluid obtained in said empty brake cylinder, said valve means being operative upon a predetermined increase in pressure in said empty brake cylinder to close communication through said unrestricted passage and open communication between said empty and load brake cylinders, and a choke in the last mentioned communication for controlling the reduction in pressure on said valve means upon the flow of fluid under pressure from the empty brake cylinder to the load brake cylinder so as to maintain sufficient pressure on said valve means to prevent operation of said valve means to close said communication and vent said load brake cylinder.

5. In a fluid pressure brake, the combination with a brake pipe, a brake cylinder, and an auxiliary reservoir, of a valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir, and valve means for regulating the pressure obtained in said brake cylinder according to the pressure acting in said auxiliary reservoir, said valve means comprising a valve for supplying fluid under pressure from said brake pipe to said brake cylinder, another valve for venting fluid under pressure from said brake cylinder, and a plurality of movable abutments subject to variations in pressure in the auxiliary reservoir and brake cylinder and to a constant pressure for controlling the operation of said valves.

6. In a fluid pressure brake, the combination with a brake pipe, a brake cylinder, and an auxiliary reservoir, of a valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir, and valve means for regulating the pressure obtained in said brake cylinder according to the pressure acting in said auxiliary reservoir, said valve means comprising a casing having a pressure chamber supplied with fluid under pressure and a brake cylinder chamber communicating with said brake cylinder and said supply chamber, a supply valve contained in said supply chamber, a spring for operating said supply valve to close communication from said supply chamber to said brake cylinder chamber, a release valve in said brake cylinder chamber and carried by said supply valve, a movable valve seat movable into seating engagement with said release valve to close communication from said brake cylinder chamber to the atmosphere and operative upon further movement to unseat said supply valve, and a plurality of movable abutments subject to variations in pressure in the brake cylinder and auxiliary reservoir and to a constant pressure for controlling the operation of said valves, one of said abutments carrying said release valve seat.

7. In a fluid pressure brake, the combination with a brake pipe, a brake cylinder, and an auxiliary reservoir, of a valve device operative upon a reduction in brake pipe pressure to supply fluid under pressure from said auxiliary reservoir to said brake cylinder to effect an application of the brakes and operative upon an increase in brake pipe pressure to supply fluid under pressure from the brake pipe to said auxiliary reservoir, and valve means for regulating the pressure in said brake cylinder in accordance with the pressure in said auxiliary reservoir, said valve means comprising a casing having a supply chamber communicating with said brake pipe, a brake cylinder chamber communicating with said brake cylinder and a passageway connecting said supply chamber to said brake cylinder chamber, a supply valve contained in said supply chamber, a spring acting on said supply valve for closing communication through said passageway, a release valve in said brake cylinder chamber, means extending through said passageway connecting the release valve to said supply valve, a movable valve seat movable into engagement with said release valve for closing communication from said brake cylinder chamber to the atmosphere and operative upon further movement to unseat said supply valve, and a plurality of movable abutments subject to variations in pressure in the auxiliary reservoir and brake cylinder and to a constant pressure for controlling the operation of said valves.

8. In a fluid pressure brake, the combination with a brake pipe, a brake cylinder, and an auxiliary reservoir, of a valve device operative upon a reduction in brake pipe pressure to supply fluid under pressure from said auxiliary reservoir to said brake cylinder to effect an application of the brakes and operative upon an increase in brake pipe pressure to supply fluid under pressure from the brake pipe to said auxiliary reservoir, and valve means for regulating the pressure in said brake cylinder in accordance with the pressure in said auxiliary reservoir, said valve means comprising a casing having a supply chamber communicating with said brake pipe, a brake cylinder chamber communicating with said brake cylinder, and a passageway connecting said supply chamber to said brake cylinder chamber, a supply valve contained in said supply chamber, a spring acting on said supply valve for closing communication through said passageway, a release valve in said brake cylinder chamber, means extending through said passageway connecting the release valve to said supply valve, a movable abutment open at one side to said brake cylinder chamber and at the opposite side of the atmosphere, means carried by said abutment having a release passageway connecting said brake cylinder chamber to the atmosphere, a valve seat formed in said means adapted to move into engagement with said release valve for closing communication through said release passageway, said valve seat being operative upon further movement of said means to unseat said supply valve, stops provided in said casing for limiting the movement of said means to unseat said valves, another abutment subject on one side to a constant pressure and on the opposite side to atmospheric pressure, a third abutment subject on one side to auxiliary reservoir pressure and open at the opposite side to said brake cylinder chamber, and means operatively connecting said movable abutments.

9. In a fluid pressure brake, the combination with a brake pipe, a brake cylinder, an auxiliary reservoir and a valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir, of valve means for regulating the pressure acting in said brake cylinder according to the pressure acting in said auxiliary reservoir, said valve means comprising a casing having a brake cylinder chamber in constant communication with said brake cylinder, a movable abutment forming one wall of said brake cylinder chamber and open at its opposite side to a chamber communicating with said auxiliary reservoir, a movable abutment forming another wall of said brake cylinder chamber and open at its opposite side to the atmosphere, the second mentioned abutment being greater in diameter than the first mentioned abutment, strut means carried by the smaller abutment engaging the larger abutment, a lug projecting from said casing to said brake cylinder chamber and having a passageway through which fluid under pressure is adapted to be supplied from said brake pipe to said brake cylinder chamber, a check valve for preventing flow of fluid under pressure through said passageway to the brake pipe, a supply valve for normally preventing flow of fluid under pressure from said passageway to said brake cylinder chamber, a release valve in said brake cylinder chamber, a stem carrying said release valve and secured to said supply valve, means carried by said larger diaphragm and having a passage connecting said brake cylinder chamber to the atmosphere, a valve seat in said means adapted to be engaged by said release valve upon movement of said larger abutment to close communication through said passage, said means being operative through said release valve upon further movement of said larger abutment to unseat said supply valve, a spring acting to seat said supply valve for determining the force required to unseat said supply valve, and a third abutment of the same diameter as said smaller abutment and subject on one side to a constant pressure and on the opposite side to atmospheric pressure, said third abutment acting in opposition to the pressure of fluid acting on the two first mentioned abutments.

10. In a fluid pressure brake, the combination with a bracket, of a valve device comprising a plurality of casing sections mounted one on the other and secured together and secured as a unit to said bracket, several of said casing sections having a gasket face, the several gasket faces being in substantial parallel alignment one with the other in substantially the same plane, a passage in each of said several casing sections opening into the gasket face thereof and each passage registering with a corresponding passage in said bracket, and a gasket interposed between said bracket and the gasket faces of said casing sections, said gasket comprising a compressible sealing ring surrounding each of the registering openings of said passages and a web securing said sealing rings in their relative positions.

11. In a fluid pressure brake, the combination with a brake cylinder and an auxiliary reservoir, of a valve device controlled by the pressures in the brake cylinder and auxiliary reservoir and a constant pressure and operative in accordance with the increase in auxiliary reservoir pressure to release fluid under pressure from said brake cylinder, and means operative upon said valve device, only after the brake cylinder pressure is reduced to a predetermined degree, for also operating said valve device to release fluid under pressure from said brake cylinder.

12. In a fluid pressure brake, the combination with a brake cylinder and an auxiliary reservoir, of a valve device controlled by the pressures in the brake cylinder and auxiliary reservoir and a constant pressure and movable upon an increase in auxiliary reservoir pressure to a position for releasing fluid under pressure from said brake cylinder in accordance with the increase in pressure in said auxiliary reservoir, and means operative upon said valve device only after the brake cylinder pressure is reduced to a predetermined degree for moving said valve device to the release position.

13. In a fluid pressure brake, the combination with a brake cylinder and an auxiliary reservoir, of a valve device controlled by the pressures in the brake cylinder and auxiliary reservoir and a constant pressure and movable upon an increase in auxiliary reservoir pressure to a position for releasing fluid under pressure from said brake cylinder in accordance with the increase in pressure in said auxiliary reservoir, a spring operative to exert a pressure on said valve device, after the brake cylinder pressure is reduced to a predetermined degree, for moving said valve device to the release position, and means controlled by brake cylinder pressure and operative when the brake cylinder pressure exceeds a predetermined degree for removing the pressure of said spring from said valve device.

14. In a fluid pressure brake, the combination with a brake cylinder, and an auxiliary reservoir, of a valve device controlled by the cooperative pressures in said brake cylinder and auxiliary reservoir acting in opposition to a constant pressure for controlling a communication through which fluid under pressure is released from said brake cylinder in accordance with the increase in auxiliary reservoir pressure, a spring cooperative with the pressure of fluid in said auxiliary reservoir after the brake cylinder pressure is reduced to a predetermined degree for operating said valve device to open said communication, and means subject at all times to the pressure of fluid in said brake cylinder, and operative when the brake cylinder pressure exceeds a predetermined degree for rendering said spring ineffective.

15. In a fluid pressure brake, the combination with a brake pipe, a brake cylinder, and an auxiliary reservoir, of a valve device operated upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir, valve means subject to the cooperating pressures in the auxiliary reservoir and brake cylinder acting in opposition to a constant pressure, said valve means being movable upon an increase in auxiliary reservoir pressure to a release position for venting fluid under pressure from said brake cylinder, and movable to another position for closing the communication through which fluid under pressure is released from the brake cylinder when the brake cylinder pressure is reduced to a pressure proportional to auxiliary reservoir pressure, a spring, means for transmitting the pressure of said spring to said valve means to aid auxiliary reservoir pressure to move said valve means to release position, and an abutment operative when a predetermined pressure is acting in said brake cylinder for rendering said spring ineffective.

16. In a fluid pressure brake, the combination with a brake pipe and a brake cylinder to which fluid under pressure is supplied to apply the brakes upon a reduction in brake pipe pressure and from which fluid under pressure is vented to release the brakes upon an increase in brake pipe pressure, of valve means for regulating the pressure in said brake cylinder in accordance with the degree of reduction and increase in brake pipe pressure, continually acting pressure exerting means for controlling the operation of said valve means, means for adjusting the acting pressure of said pressure exerting means when the brakes are released, and means operated upon a reduction in brake pipe pressure for holding said pressure exerting means in the adjusted condition.

17. In a fluid pressure brake, the combination with a brake pipe and a brake cylinder to which fluid under pressure is supplied to apply the brakes upon a reduction in brake pipe pressure and from which fluid under pressure is vented to release the brakes upon an increase in brake pipe pressure, of valve means for regulating the pressure in said brake cylinder in accordance with the degree of reduction and increase in brake pipe pressure, continually acting pressure exerting means for controlling the operation of said valve means when the brakes are applied, means for adjusting the acting pressure of said pressure exerting means when the brakes are released, and means operative upon effecting a reduction in brake pipe pressure for holding said pressure exerting means in the adjusted condition and operative upon a substantially complete release of the brakes for releasing said pressure exerting means.

18. In a fluid pressure brake, the combination with a bracket having a flat gasket face and a gasket applied to said face, of a valve device comprising a plurality of casing sections mounted one on the other and secured together as a unit, several of said casing sections having on one side a flat gasket face, the several gasket faces being substantially parallel one to the other and in substantially the same plane, said unit being secured to said bracket with the several gasket faces engaging said gasket, each of said several casing sections having a passage leading to the gasket face thereof, said gasket having openings disposed according to the openings in the several gasket faces and establishing communication from the passages in said several casing sections to corresponding passages in said bracket.

19. In a fluid pressure brake, the combination with a bracket having a flat gasket face and a gasket applied to said face, of a valve device comprising a plurality of casing sections mounted one on the other and secured together as a unit, several of said casing sections having on one side a flat gasket face, the several gasket faces being substantially parallel one to the other and in substantially the same plane, said unit being secured to said bracket with the several gasket faces engaging said gasket, each of said several casing sections having a passage leading to the gasket face thereof, said gasket having openings disposed according to the openings in the several gasket faces and establishing communication from the passages in said several casing sections to corresponding passages in said bracket, said gasket having a resilient raised portion surrounding each opening through said gasket and adapted to prevent leakage from the passages communicating through said openings, regardless of slight variations in alignment of said several gasket faces.

CLYDE C. FARMER.